US007485600B2

(12) United States Patent
Harutyunyan et al.

(10) Patent No.: US 7,485,600 B2
(45) Date of Patent: Feb. 3, 2009

(54) CATALYST FOR SYNTHESIS OF CARBON SINGLE-WALLED NANOTUBES

(75) Inventors: Avetik Harutyunyan, Columbus, OH (US); Toshio Tokune, Columbus, OH (US); Elena Mora Fernandez, Columbus, OH (US)

(73) Assignees: Honda Motor Co., Ltd., Tokyo (JP); The Ohio State University Research Foundation, Columbus, OH (US)

( * ) Notice: Subject to any disclaimer, the term of this patent is extended or adjusted under 35 U.S.C. 154(b) by 411 days.

(21) Appl. No.: 10/992,277

(22) Filed: Nov. 17, 2004

(65) Prior Publication Data
US 2006/0104890 A1 May 18, 2006

(51) Int. Cl.
*B01J 23/00* (2006.01)
*B01J 23/70* (2006.01)
*B01J 23/08* (2006.01)
*B01J 20/00* (2006.01)
*B01J 21/00* (2006.01)

(52) U.S. Cl. .................. 502/336; 502/338; 502/355; 502/415; 502/439

(58) Field of Classification Search .......... 502/240, 502/300–355, 104, 182, 415, 407, 439; 423/447.3
See application file for complete search history.

(56) References Cited

U.S. PATENT DOCUMENTS

| | | | |
|---|---|---|---|
| 4,093,561 A * | 6/1978 | Nishikawa et al. | 502/336 |
| 4,096,096 A * | 6/1978 | Nishikawa et al. | 502/338 |
| 5,047,379 A * | 9/1991 | Alyea et al. | 502/79 |
| 5,424,054 A | 6/1995 | Bethune et al. | |
| 6,090,742 A * | 7/2000 | Culross | 502/258 |
| 6,281,158 B1 * | 8/2001 | Gabrielov et al. | 502/216 |
| 6,596,055 B2 * | 7/2003 | Cooper et al. | 95/116 |
| 6,660,680 B1 | 12/2003 | Hampden-Smith et al. | |
| 6,703,343 B2 * | 3/2004 | Park | 502/355 |
| 2002/0034676 A1 * | 3/2002 | Kim et al. | 429/44 |
| 2002/0165091 A1 * | 11/2002 | Resasco et al. | 502/255 |
| 2003/0004058 A1 * | 1/2003 | Li et al. | 502/258 |
| 2003/0104933 A1 * | 6/2003 | Sun et al. | 502/302 |
| 2003/0119920 A1 * | 6/2003 | Wang et al. | 518/715 |
| 2003/0149163 A1 * | 8/2003 | Sun et al. | 524/496 |
| 2003/0181328 A1 * | 9/2003 | Hwang et al. | 502/325 |
| 2004/0018416 A1 * | 1/2004 | Choi et al. | 429/44 |
| 2004/0072683 A1 * | 4/2004 | Kodas et al. | 502/224 |
| 2004/0147620 A1 * | 7/2004 | Wang et al. | 518/715 |

(Continued)

OTHER PUBLICATIONS

Bethune, D.S. et al., "Cobalt-Catalysed Growth Of Carbon Nanotubes With Single-Atomic-Layer Walls", Nature, Jun. 17, 1993, vol. 363, pp. 605-607.

(Continued)

*Primary Examiner*—Cam N. Nguyen
(74) *Attorney, Agent, or Firm*—Fenwick & West LLP; Mark E. Duell (57) ABSTRACT

Methods and processes for preparing supported metal catalysts are provided, where the supported metal catalysts can be used for the bulk synthesis of carbon nanotubes. The salts of the metal and the support are selected such that they are soluble in the same solvent. The catalyst can be prepared from the liquid phase through joint precipitation of the metal and the support material. The methods can be used to increase the metal load on the support. Use of the catalysts increases the yield of the carbon nanotubes.

36 Claims, 2 Drawing Sheets

U.S. PATENT DOCUMENTS

| | | | |
|---|---|---|---|
| 2005/0112048 A1* | 5/2005 | Tsakalakos et al. | 423/439 |
| 2005/0112051 A1* | 5/2005 | Liu et al. | 423/447.1 |
| 2005/0112052 A1* | 5/2005 | Gu et al. | 423/447.1 |
| 2005/0123467 A1* | 6/2005 | Harutyunyan | 423/447.1 |
| 2006/0025515 A1* | 2/2006 | Scaringe et al. | 524/496 |
| 2006/0078489 A1* | 4/2006 | Harutyunyan et al. | 423/447.3 |
| 2006/0083674 A1* | 4/2006 | Maruyama et al. | 423/447.3 |
| 2006/0104889 A1* | 5/2006 | Harutyunyan et al. | 423/447.3 |

OTHER PUBLICATIONS

Harutyunyan, A. R. et al., "CVD Synthesis of Single Wall Carbon Nanotubes Under "Soft" Conditions", American Chemical Society, Nano Letters, 2002, vol. 2, No. 5, pp. 525-530.

Iijima, Sumio et al., "Single-Shell Carbon Nanotubes Of 1-Nm Diameter", *Nature*, Jun. 17, 1993, vol. 363, pp. 603-605.

Ivanov, V. et al. "The Study Of Carbon Nanotubles Produced By Catalytic Method", Elsevier Science B.V., Chemical Physics Letters, vol. 223, Jun. 24, 1994, pp. 329-335.

Journet, C. et al., "Large-Scale Production Of Single-Walled Carbon Nanotubes By The Electric-Arc Technique", *Nature*, vol. 388, Aug. 21, 1997, pp. 756-758.

Li, W.Z. et al., "Large-Scale Synthesis of Aligned Carbon Nanotubes", *Science*, vol. 274, Dec. 6, 1996, pp. 1701-1703.

Thess, Andreas et al., "Crystalline Ropes of Metallic Carbon Nanotubes", *Science*, vol. 273, Jul. 26, 1996, pp. 483-487.

Tanaka, Atsushi et al., "Formation of Fine Fe—Ni Particles for the Non-supported Catalytic Synthesis of Uniform Carbon Nanofibers", Elsevier Science B.V., Carbon, Feb. 2004, pp. 1291-1298.

PCT International Search Report and Written Opinion, PCT/US05/41621, Aug. 4, 2006, 9 pages.

* cited by examiner

CATALYST FOR SYNTHESIS OF CARBON SINGLE-WALLED NANOTUBES

FIELD OF INVENTION

The present invention relates to methods for the preparation supported catalysts for use in the synthesis of carbon single-walled nanotubes using chemical vapor deposition method.

BACKGROUND

Metal nanoparticles are defined as having an average particle size less than 100 nm, and they have high surface area and high reactivity. Metal nanoparticles are an increasingly important industrial material, finding use as reaction catalysis (including serving as a reaction substrate), improving the behavior and properties of materials, drug delivery, as catalysts for the synthesis of carbon nanotubes, as a catalyst for hydrogen gas synthesis, and in the production of metal hydrides.

Metal nanoparticles can be produced by several techniques such as plasma or laser-driven gas phase reactions, evaporation-condensation mechanisms, and various wet chemical techniques. For example, U.S. Pat. No. 6,660,680 to Hampden-Smith et al. discloses the use of metal organics as precursors for the production of electrocatalyst powders. In their process, an aerosol of droplets from a liquid containing the metal organic and the support material is generated, the droplet, suspended in a carrier gas, is heated to remove the liquid to form particles of the catalyst dispersed on the support phase. However, none of the current technique provides a reliable, simple, and low-cost method for production of nanoparticles of a controlled size. The current techniques produce particles with poor crystallinity, a wide distribution of sizes around a desired nanoparticle size, or require specialized equipment, long processing times, or expensive specialty chemicals. For example, the preferred methods for the production of metal nanoparticles are hydrometallurgy and spray pyrolysis. However, these methods have several major drawbacks including preparation and handling of toxic materials that are difficult to handle, environmental emission control requirements for gaseous and liquid effluents, and a difficulty to produce average particle sizes below 100 nm.

One potentially attractive wet chemical technique for synthesis of metal nanoparticles is thermal decomposition, as these reactions may be carried using relatively simple equipment. However, currently known methods of metal nanoparticle formation using thermal decomposition require addition of a separate surfactant, thus increasing the complexity and cost of the method.

A particular application of the metal nanoparticles is in the production of carbon nanotubes. Carbon nanotubes are hexagonal networks of carbon atoms forming seamless tubes with each end capped with half of a fullerene molecule. They were first reported in 1991 by Sumio Iijima who produced multi-layer concentric tubes or multi-walled carbon nanotubes by evaporating carbon in an arc discharge. In 1993, Iijima's group and an IBM team headed by Donald Bethune independently discovered that a single-wall nanotube could be made by vaporizing carbon together with a transition metal such as iron or cobalt in an arc generator (see Iijima et al. Nature 363:603 (1993); Bethune et al., Nature 363: 605 (1993) and U.S. Pat. No. 5,424,054). The original syntheses produced low yields of non-uniform nanotubes mixed with large amounts of soot and metal particles.

Presently, there are three main approaches for the synthesis of single- and multi-walled carbon nanotubes. These include the electric arc discharge of graphite rod (Journet et al. Nature 388: 756 (1997)), the laser ablation of carbon (Thess et al. Science 273: 483 (1996)), and the chemical vapor deposition of hydrocarbons (Ivanov et al. Chem. Phys. Lett 223: 329 (1994); Li et al. Science 274: 1701 (1996)). Multi-walled carbon nanotubes can be produced on a commercial scale by catalytic hydrocarbon cracking while single-walled carbon nanotubes are still produced on a gram scale.

Generally, single-walled carbon nanotubes are preferred over multi-walled carbon nanotubes because they have unique mechanical and electronic properties. Defects are less likely to occur in single-walled carbon nanotubes because multi-walled carbon nanotubes can survive occasional defects by forming bridges between unsaturated carbon valances, while single-walled carbon nanotubes have no neighboring walls to compensate for defects. Defect-free single-walled nanotubes are expected to have remarkable mechanical, electronic and magnetic properties that could be tunable by varying the diameter, number of concentric shells, and chirality of the tube.

It is well known that the diameter of the SWNTs produced is proportional to the size of the catalyst particle. It is generally recognized that smaller catalyst particles of less than 3 nm are preferred for the growth of smaller diameter carbon nanotubes. Further, the distribution of the catalyst particle size influences on the yield and homogeneity of the SWNTs. Thus, smaller the catalyst particle size and narrower the distribution of the particle sizes, the higher the quality of the SWNTs. However, the smaller catalyst particles easily aggregate at the higher temperatures required for the synthesis of carbon nanotubes. Further, catalysts of small average particle sizes are difficult to synthesize. For example, Tanaka et al. (2004) Carbon 24: 1285-1292, disclose a method of catalyst preparation that includes the precipitation of ferric and nickel carbonate from ferric nitrate and nickel nitrate solutions for the synthesis of carbon nanofibers. In addition, the ratio of catalyst to support determines the quantity and quality of the SWNTs produced. Typically, a ratio of catalyst to support of about 1:10 to about 1:20 is used. It is difficult to increase the catalyst load on the support because the catalyst particles aggregate. Consequently, it has been reported that catalyst to support ratios of 1:1 to 1:3 are not suitable for the production of SWNTs. However, increasing the ratio increases the cost of the materials for the bulk production of SWNTs.

Thus, there is a need for simple, reliable, and low cost thermal decomposition methods for producing supported metal nanoparticles having higher catalyst loads that allows for control of the average particle size while minimizing the amount of variance in the particle sizes. Accordingly, the present invention provides methods and processes for the production of metal nanoparticle catalysts that can be used for the bulk synthesis of SWNTs.

SUMMARY

The present invention provides methods and processes for producing supported metal nanoparticles that can be used in methods and processes for growing single-wall carbon nanotubes in high yields. The supported metal nanoparticles can be produced by mixing the metal catalyst and support salts in a solvent until a homogeneous solution is obtained, heating the solution, and then evaporating the solvent to obtain the supported metal nanoparticles.

In one aspect, the present invention provides methods for producing supported metal nanoparticles, wherein a solution is obtained by mixing a catalyst, a support, and a solvent, and the solution is heated to form supported metal nanoparticles. The catalyst can be a metal salt, where the metal is a Group V metal, a Group VI metal, a Group VII metal, a Group VIII metal, a lanthanide, or a transition metal or combinations thereof. The support can be a salt of Al, Si, or Mg. The counter ion for the metal salt and the support can be nitrate, nitrite, nitride, perchlorate, sulfate, sulfide, acetate, halide, hydroxide, methoxide, ethoxide, or acetylacetonate. The catalyst and the support are mixed in a ratio of about 1:1 to about 1:5, preferably in a ratio of about 1:1 to about 1:3. The solvent can be water, methanol, ethanol, or a glycol ether. The metal salt and the support are selected such that they are soluble in the solvent. Optionally, the metal salt and the support preferably have melting points that are similar.

In another aspect, the methods involve contacting a carbon precursor gas with supported metal nanoparticles, wherein the supported metal nanoparticles are produced by mixing a catalyst, a support, and a solvent; and heating the solution to form supported metal nanoparticles, and wherein the catalyst and the support are in a ratio of about 1:1 to about 1:5. The catalyst can be a metal salt, where the metal is a Group V metal, a Group VI metal, a Group VII metal, a Group VIII metal, a lanthanide, or a transition metal or combinations thereof. The support can be a salt of Al, Si, or Mg. The counter ion for the metal salt and the support can be nitrate, nitrite, nitride, perchlorate, sulfate, sulfide, acetate, halide, hydroxide, methoxide, ethoxide, or acetylacetonate. The catalyst and the support are mixed in a ratio of about 1:1 to about 1:5, preferably in a ratio of about 1:1 to about 1:3. The solvent can be water, methanol, ethanol, or glycol ether. The metal salt and the support are selected such that they are soluble in the solvent.

These and other aspects of the present invention will become evident upon reference to the following detailed description. In addition, various references are set forth herein which describe in more detail certain procedures or compositions, and are therefore incorporated by reference in their entirety.

DETAILED DESCRIPTION

I. Definitions

Unless otherwise stated, the following terms used in this application, including the specification and claims, have the definitions given below. It must be noted that, as used in the specification and the appended claims, the singular forms "a," "an" and "the" include plural referents unless the context clearly dictates otherwise. Definition of standard chemistry terms may be found in reference works, including Carey and Sundberg (1992) "Advanced Organic Chemistry $3^{rd}$ Ed." Vols. A and B, Plenum Press, New York, and Cotton et al. (1999) "Advanced Inorganic Chemistry $6^{th}$ Ed." Wiley, New York.

The terms "single-walled carbon nanotube" or "one-dimensional carbon nanotube" are used interchangeable and refer to cylindrically shaped thin sheet of carbon atoms having a wall consisting essentially of a single layer of carbon atoms, and arranged in an hexagonal crystalline structure with a graphitic type of bonding.

The term "multi-walled carbon nanotube" as used herein refers to a nanotube composed of more than one concentric tubes.

The terms "metalorganic" or "organometallic" are used interchangeably and refer to co-ordination compounds of organic compounds and a metal, a transition metal or metal halide.

II. Overview

The present invention discloses methods and processes for producing supported metal nanoparticles. The metal nanoparticles are produced by dissolving metal and the support material in the same reaction vessel, and evaporating the solvent. The ratio of the metal to the support material can be about 1:1 to about 1:3. The metal nanoparticles thus produced can be used as catalysts in the large scale manufacture of carbon single-wall nanotubes (SWNT) and structures using the carbon vapor deposition method. The catalysts produced by the inventive methods provide high yield and high quality of carbon SWNTs. The methods and processes of the invention are advantageous in that they require about two times less support material, thereby decreasing the cost of producing SWNTs. In addition, the yield of the SWNTs can be increased by more than about 100%.

III. The Catalyst

The catalyst composition can be any catalyst composition known to those of skill in the art. The catalyst particles themselves can be of any material that exhibits ferri- or ferromagnetism. Conveniently, the particles will be of a magnetic metal or alloy, such as, for example, iron, iron oxide, or a ferrite such as cobalt, nickel, chromium, yttrium, hafnium or manganese. The particles useful according to the invention will preferably have an average overall particle size of up to 50 nm to about 1 µm, although, in general, the particle sizes for individual particles can be from about 400 nm to about 1 µm. The catalyst particles are preferably at least single domain size, generally less than about 2 nm.

The function of the catalyst when used in the carbon nanotube growth process is to decompose the carbon precursors and aid the deposition of ordered carbon. The methods and processes of the present invention preferably use metal nanoparticles as the metallic catalyst. The metal or combination of metals selected as the catalyst can be processed to obtain the desired particle size and diameter distribution. The metal nanoparticles can be separated by being supported on a material suitable for use as a support during synthesis of carbon nanotubes. As known in the art, the support can be used to separate the catalyst particles from each other thereby providing the catalyst materials with greater surface area in the catalyst composition. Such support materials include powders of crystalline silicon, polysilicon, silicon nitride, tungsten, magnesium, aluminum and their oxides, preferably aluminum oxide, silicon oxide, magnesium oxide, or titanium dioxide, or combination thereof, optionally modified by addition elements, are used as support powders. Silica, alumina and other materials known in the art may be used as support, preferably alumina is used as the support.

The metal catalyst can be selected from a Group V metal, such as V or Nb, and mixtures thereof, a Group VI metal including Cr, W, or Mo, and mixtures thereof, VII metal, such as, Mn, or Re, Group VIII metal including Co, Ni, Ru, Rh, Pd, Os, Ir, Pt, and mixtures thereof, or the lanthanides, such as Ce, Eu, Er, or Yb and mixtures thereof, or transition metals such as Cu, Ag, Au, Zn, Cd, Sc, Y, or La and mixtures thereof.

Specific examples of mixture of catalysts, such as bimetallic catalysts, which may be employed by the present invention include Co—Cr, Co—W, Co—Mo, Ni—Cr, Ni—W, Ni—Mo, Ru—Cr, Ru—W, Ru—Mo, Rh—Cr, Rh—W, Rh—Mo, Pd—Cr, Pd—W, Pd—Mo, Ir—Cr, Pt—Cr, Pt—W, and Pt—Mo. Preferably, the metal catalyst is iron, cobalt, nickel, molybdeum, or a mixture thereof, such as Fe—Mo, Co—Mo and Ni—Fe—Mo.

The metal, bimetal, or combination of metals are used to prepare metal nanoparticles having defined particle size and diameter distribution. The catalyst nanoparticles can be prepared by thermal decomposition of the corresponding metal salt added to a passivating solvent, and the temperature of the solvent adjusted to provide the metal nanoparticles, as described in the co-pending and co-owned U.S. patent application Ser. No. 10/304,316, or by any other method known in the art. The particle size and diameter of the metal nanoparticles can be controlled by using the appropriate concentration of metal in the passivating solvent and by controlling the length of time the reaction is allowed to proceed at the thermal decomposition temperature. The metal salt can be any salt of the metal, and can be selected such that the salt is soluble in the solvent and/or the melting point of the metal salt is lower than the boiling point of the passivating solvent. Thus, the metal salt contains the metal ion and a counter ion, where the counter ion can be nitrate, nitrite, nitride, perchlorate, sulfate, sulfide, acetate, halide, oxide, such as methoxide or ethoxide, acetylacetonate, and the like. For example, the metal salt can be iron acetate ($FeAc_2$), nickel acetate ($NiAc_2$), palladium acetate ($PdAc_2$), molybdenum acetate ($MoAc_3$), and the like, and combinations thereof. The melting point of the metal salt is preferably about 5° C. to 50° C. lower than the boiling point, more preferably about 5° C. to about 20° C. lower than the boiling point of the passivating solvent. The solvent can be an ether, such as a glycol ether, 2-(2-butoxyethoxy)ethanol, $H(OCH_2CH_2)_2O(CH_2)_3CH_3$, which will be referred to below using the common name dieethylene glycol mono-n-butyl ether, and the like.

The relative amounts of metal salt and passivating solvent can be factors in controlling the size of nanoparticles produced. A wide range of molar ratios, here referring to total moles of metal salt per mole of passivating solvent, can be used for forming the metal nanoparticles. Typical molar ratios of metal salt to passivating solvent include ratios of about 0.0222 (1:45) to about 2.0 (2:1). Thus, for example, about $5.75 \times 10^{-5}$ to about $1.73 \times 10^{-3}$ moles (10-300 mg) iron acetate can be placed in about $3 \times 10^{-4}$ to about $3 \times 10^{-3}$ moles (50-500 ml) diethylene glycol mono-n-butyl ether.

In another aspect of the invention, more than one metal salt may be added to the reaction vessel in order to form metal nanoparticles composed of two or more metals. The molar ratio of a first metal salt relative to a second metal salt may be between about 1:1 and about 10:1, or any ratio in between, such as, for example 2:1, 3:1, 3:2, 4:1, 4:3, and the like. Those skilled in the art will recognize that other combinations of metal salts and other molar ratios of a first metal salt relative to a second metal salt may be used in order to synthesize metal nanoparticles with various compositions.

Preferably, the support material is added to the reaction mixture containing the metal salt. The support material can be added as a solid, or it can be first dissolved in the passivating solvent and then added to the solution containing the metal salt. The solid support can be silica, alumina, MCM-41, MgO, $ZrO_2$, aluminum-stabilized magnesium oxide, zeolites, or other supports known in the art, and combinations thereof. For example, $Al_2O_3$—$SiO_2$ hybrid support could be used. Preferably, the support material is soluble in the passivating solvent. In one aspect, the counterion of the metal salt and the support material is the same, thus, for example, nitrites can be the counterion in the metal salt and in the support material. Thus, the support material contains the element of the support material and a counter ion, where the counter ion can be nitrate, nitrite, nitride, perchlorate, sulfate, sulfide, acetate, halide, oxide, such as methoxide or ethoxide, acetylacetonate, and the like. Thus, for example, nitrites can be the counterion in metal ions (ferrous nitrite) and in the support material (aluminum nitrite), or the support can be aluminum oxide ($Al_2O_3$) or silica ($SiO_2$). The support material can be powdered thereby providing small particle sizes and large surface areas. The powdered support material can preferably have a particle size between about 0.01 μm to about 100 μm, more preferably about 0.1 μm to about 10 μm, even more preferably about 0.5 μm to about 5 μm, and most preferably about 1 μm to about 2 μm. The powdered support material can have a surface area of about 50 to about 1000 $m^2/g$, more preferably a surface area of about 200 to about 800 $m^2/g$. The powdered oxide can be freshly prepared or commercially available. For example, a suitable $Al_2O_3$ powder with 1-2 μm particle size and having a surface area of 300-500 $m^2/g$ is commercially available from Alfa Aesar of Ward Hill, Mass., or Degussa, N.J. Powdered oxide can be added to achieve a desired weight ratio between the powdered oxide and the initial amount of metal used to form the metal nanoparticles. Typically, the weight ratio can be between about 10:1 and about 15:1. For example, if 100 mg of iron acetate is used as the starting material, then about 320 to 480 mg of powdered oxide can be introduced into the solution. The weight ratio of metal nanoparticles to powdered oxide can be between about 1:1 and 1:10, such as, for example, 1:1, 2:3, 1:4, 3:4, 1:5, and the like.

After forming a homogenous mixture, metal nanoparticles are formed during the thermal decomposition. The thermal decomposition reaction is started by heating the contents of the reaction vessel to a temperature above the melting point of at least one metal salt in the reaction vessel. Any suitable heat source may be used including standard laboratory heaters, such as a heating mantle, a hot plate, or a Bunsen burner. Other methods of increasing the temperature of the contents of the reaction vessel to above the melting point of the metal salt will be apparent to those skilled in the art. The average particle size of the metal nanoparticles can be controlled by adjusting the length of the thermal decomposition. Typical reaction times range from about 20 minutes to about 2400 minutes, depending on the desired nanoparticle size. The thermal decomposition reaction can be stopped at the desired time by reducing the temperature of the contents of the reaction vessel to a temperature below the melting point of the metal salt. Thus, the reaction can be stopped by simply removing or turning off the heat source and allowing the reaction vessel to cool, or the reaction can be stopped by placing the reaction vessel in a bath.

Preferably, the contents of the reaction vessel are refluxed during the heating step. A standard reflux apparatus can be used, such as those available from commercial sources. During the thermal decomposition, water (or another coolant) is passed through condensing jacket. Vapors rising from the passivating solvent are cooled as they pass through tube, leading to condensation of the passivating solvent vapors. The condensed passivating solvent then falls back into the reaction vessel. This recondensation prevents any significant loss of volume of the passivating solvent during the thermal decomposition reaction. Thus, the relative ratio of metal to passivating solvent stays substantially constant throughout the reaction. Those skilled in the art will recognize that while refluxing is a preferred method for carrying out the thermal decomposition reaction, it is not necessary for nanoparticle formation. As long as the temperature of the homogeneous mixture is raised to above the melting point of the metal salt, the desired thermal decomposition reaction will take place and lead to formation of metal nanoparticles.

Metal nanoparticles having an average particle size of about 0.01 nm to about 20 nm, more preferably about 0.1 nm to about 3 nm and most preferably about 0.3 m to 2 nm can be prepared. The metal nanoparticles can thus have a particle size of 0.1, 1, 2, 3, 4, 5, 6, 7, 8, 9, or 10 nm, and up to about 20 nm. In another aspect, the metal nanoparticles can have a range of particle size, or diameter distribution. For example, the metal nanoparticles can have particle sizes in the range of about 0.1 nm and about 5 nm in size, about 3 nm and about 7 nm in size, or about 5 nm and about 11 nm in size.

The size and distribution of metal nanoparticles produced can be verified by any suitable method. One method of verification is transmission electron microscopy (TEM). A suitable model is the Phillips CM300 FEG TEM that is commercially available from FEI Company of Hillsboro, Oreg. In order to take TEM micrographs of the metal nanoparticles, 1 or more drops of the metal nanoparticle/passivating solvent solution are placed on a carbon membrane grid or other grid suitable for obtaining TEM micrographs. The TEM apparatus is then used to obtain micrographs of the nanoparticles that can be used to determine the distribution of nanoparticle sizes created.

As will be apparent to those of skill in the art, the catalyst thus prepared can be stored for later use. In another aspect, the metal nanoparticles can be previously prepared, isolated from the passivating solvent, and purified, and then added to a powdered oxide in a suitable volume of the same or different passivating solvent. The metal nanoparticles and powdered oxide can be homogenously dispersed, extracted from the passivating solvent, and processed to increase the effective surface area as described above. Other methods for preparing the metal nanoparticle and powdered oxide mixture will be apparent to those skilled in the art.

The size and distribution of metal nanoparticles produced by the present invention may be verified by any suitable method. One method of verification is transmission electron microscopy (TEM). A suitable model is the Phillips CM300 FEG TEM that is commercially available from FEI Company of Hillsboro, Oreg. In order to take TEM micrographs of the metal nanoparticles, 1 or more drops of the metal nanoparticle/passivating solvent solution are placed on a carbon membrane grid or other grid suitable for obtaining TEM micrographs. The TEM apparatus can then be used to obtain micrographs of the nanoparticles to determine the distribution of nanoparticle sizes created. When more than one type of metal salt is used in the synthesis of the metal nanoparticles, the composition of the resulting metal nanoparticles can be determined by using X-ray diffraction (XRD). A suitable XRD tool is a Bruker D-8 X-ray diffractometer available from Bruker-AXS GMBH of Karlsruhe, Germany. Typically, a sample of metal nanoparticles can be prepared for XRD analysis by placing a drop of metal nanoparticle/passivating solvent mixture on a measurement substrate, such as an $SiO_2$ substrate. The passivating solvent can then be evaporated away by heating the substrate to 250° C., leaving behind the metal nanoparticles.

The metal nanoparticles thus formed can be used as a growth catalyst for synthesis of carbon nanotubes, nanofibers, and other one-dimensional carbon nanostructures by a chemical vapor deposition (CVD) process. The supported catalyst nanoparticles prepared above provide for dispersion of the catalyst (Fe, Ni, Co, Cu, Mo, etc.), thereby providing control over the particle size of the catalysts which can be important for the synthesis of SWNTs. Further, the use of inventive methods make it possible to increase the load of the catalyst on the support material. Thus, the inventive catalysts are more efficient per unit weight of the catalyst, and are more economical for the production of bulk SWNTs.

IV. Carbon Precursors

The carbon nanotubes can be synthesized using carbon precursors, such as carbon containing gases. In general, any carbon containing gas that does not pyrolize at temperatures up to 800° C. to 1000° C. can be used. Examples of suitable carbon-containing gases include carbon monoxide, aliphatic hydrocarbons, both saturated and unsaturated, such as methane, ethane, propane, butane, pentane, hexane, ethylene, acetylene and propylene; oxygenated hydrocarbons such as acetone, and methanol; aromatic hydrocarbons such as benzene, toluene, and naphthalene; and mixtures of the above, for example carbon monoxide and methane. In general, the use of acetylene promotes formation of multi-walled carbon nanotubes, while CO and methane are preferred feed gases for formation of single-walled carbon nanotubes. The carbon-containing gas may optionally be mixed with a diluent gas such as hydrogen, helium, argon, neon, krypton and xenon or a mixture thereof.

V. Synthesis of Carbon Nanotubes

The methods and processes of the invention provide for the bulk synthesis of SWNTs. In one aspect of the invention, the supported metal nanoparticles prepared above can be contacted with the carbon source at the reaction temperatures according to the literature methods described in Harutyunyan et al., NanoLetters 2, 525 (2002). Alternatively, the supported metal nanoparticles can be aerosolized and introduced into the reactor maintained at the reaction temperature. Simultaneously, the carbon precursor gas is introduced into the reactor. The flow of reactants within the reactor can be controlled such that the deposition of the carbon products on the walls of the reactor is reduced. The carbon nanotubes thus produced can be collected and separated.

The supported metal nanoparticles can be aerosolized by any of the art known methods. In one method, the supported metal nanoparticles are aerosolized using an inert gas, such as helium, neon, argon, krypton, xenon, or radon. Preferably argon is used. Typically, argon, or any other gas, is forced through a particle injector, and into the reactor. The particle injector can be any vessel that is capable of containing the supported metal nanoparticles and that has a means of agitating the supported metal nanoparticles. Thus, the catalyst deposited on a powdered porous oxide substrate can be placed in a beaker that has a mechanical stirrer attached to it. The supported metal nanoparticles can be stirred or mixed in order to assist the entrainment of the catalyst in the transporter gas, such as argon.

Thus, the nanotube synthesis generally occurs as described in the co-pending and coowned application U.S. application Ser. No. 10/727,707, filed on Dec. 3, 2003. An inert transporter gas, preferably argon gas, is generally passed through a particle injector. The particle injector can be a beaker or other vessel containing the growth catalyst supported on a powdered porous oxide substrate. The powdered porous oxide substrate in the particle injector can be stirred or mixed in order to assist the entrainment of the powdered porous oxide substrate in the argon gas flow. Optionally, the inert gas can be passed through a drying system to dry the gas. The argon gas, with the entrained powdered porous oxide, can then be passed through a pre-heater to raise the temperature of this gas flow to about 400° C. to about 500° C. The entrained powdered porous oxide is then delivered to the reaction chamber. A flow of methane or another carbon source gas and hydrogen is also delivered to the reaction chamber. The typical flow rates can be 500 sccm for argon, 400 sccm for methane, and 100 sccm for He. Additionally, 500 sccm of argon can be directed into the helical flow inlets to reduce deposition of carbon products on the wall of the reaction chamber. The reaction chamber can be heated to between about 300° C. and 900° C. during reaction using heaters. The temperature is preferably kept below the decomposition temperature of the carbon precursor gas. For example, at temperatures above 1000° C., methane is known to break down directly into soot rather than forming carbon nanostructures with the metal growth catalyst. Carbon nanotubes and other carbon nanostructures synthesized in reaction chamber can then be collected and characterized.

In one aspect of the invention, the diameter distribution of the synthesized SWNTs is substantially uniform. Thus, about 90% of the SWNTs have a diameter within about 25% of the mean diameter, more preferably, within about 20% of the mean diameter, and even more preferably, within about 15% of the mean diameter. Thus, the diameter distribution of the synthesized SWNTs can be about 10% to about 25% within the mean diameter, more preferably about 10% to about 20% of the mean diameter, and even more preferably about 10% to about 15% of the mean diameter.

Carbon SWNTs can be synthesized with the yields ranging from about 4 wt % to about 60 wt % (wt % carbon relative to the supported catalyst nanoparticles). The SWNTs produced can be characterized using transmission electron microscopy (TEM), Raman spectroscopy, thermogravimetric analyzer (TGA), and the like.

The Raman spectra of SWNTs has three major peaks, which are the G-band at about 1590 $cm^{-1}$, D-band at about 1350 $cm^{-1}$, and the Radial breathing mode (RBM) at about 100-300 $cm^{-1}$, RBM frequency is proportional to an inverse of the diameter of SWNTs and can thus be used to calculate the diameter of the SWNT. Normally, a red shift in RBM peak corresponds to an increase in the mean diameter of SWNTs. The tangential mode G-band related to the Raman-allowed phonon mode $E_{2g}$ can be a superposition of two peaks. The double peak at about 1593 and 1568 $cm^{-1}$ has been assigned to semiconductor SWNTs, while the broad Breit-Wigner-Fnao line at about 1550 $cm^{-1}$ has been assigned to metallic SWNTs. Thus, G-band offers a method for distinguishing between metallic and semiconducting SWNTs. The D-band structure is related to disordered carbon, the presence of amorphous carbon, and other defects due to the $sp^2$-carbon network. The ratio of the G-band to D-band in the Raman spectra ($I_G$:$I_D$ or G/D ratio) of SWNTs can be used as an index to determine the purity and quality of the SWNTs produced. Preferably, $I_G$:$I_D$ is about 1 to about 500, preferably about 5 to about 400.

Using the methods and processes of the invention, SWNTs with $I_G$:$I_D$ of about 10 to about 40 can be manufactured. The quality of the SWNTs depends on the particle size of the catalyst. The particle sizes of the catalyst particles can be estimated using SQUID. The use of catalyst particles thus prepared provides SWNTs of greater purity and quality.

The carbon nanotubes and nanostructures produced by the methods and processes described above can be used in applications that include Field Emission Devices, Memory devices (high-density memory arrays, memory logic switching arrays), Nano-MEMs, AFM imaging probes, distributed diagnostics sensors, and strain sensors. Other key applications include: thermal control materials, super strength and light weight reinforcement and nanocomposites, EMI shielding materials, catalytic support, gas storage materials, high surface area electrodes, and light weight conductor cable and wires, and the like.

EXAMPLES

Below are examples of specific embodiments for carrying out the present invention. The examples are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

Example 1

Preparation of the Supported Catalyst

Catalysts were prepared by impregnating support materials in metal salt solutions. In a typical procedure, $Fe(SO_4)_3.5H_2O$ was used at a molar ratio of Fe:Al 1:2. Under a nitrogen atmosphere, $Fe(SO_4)_3.5H_2O$ was added to water in the molar ratio of 1 mM:20 mM. Then aluminum nitrite was added to the metal salt containing aqueous solution. The reaction mixture was mixed using a mechanical stirrer under the nitrogen atmosphere, and heated at about 110° C. while flowing a stream of $N_2$ gas over the mixture to remove the solvent. A dark film formed on the walls of the reaction flask. The dark film was collected and ground with an agate mortar to obtain a fine black powder.

Example 2

Synthesis of Carbon Nanotubes

Figure 1:
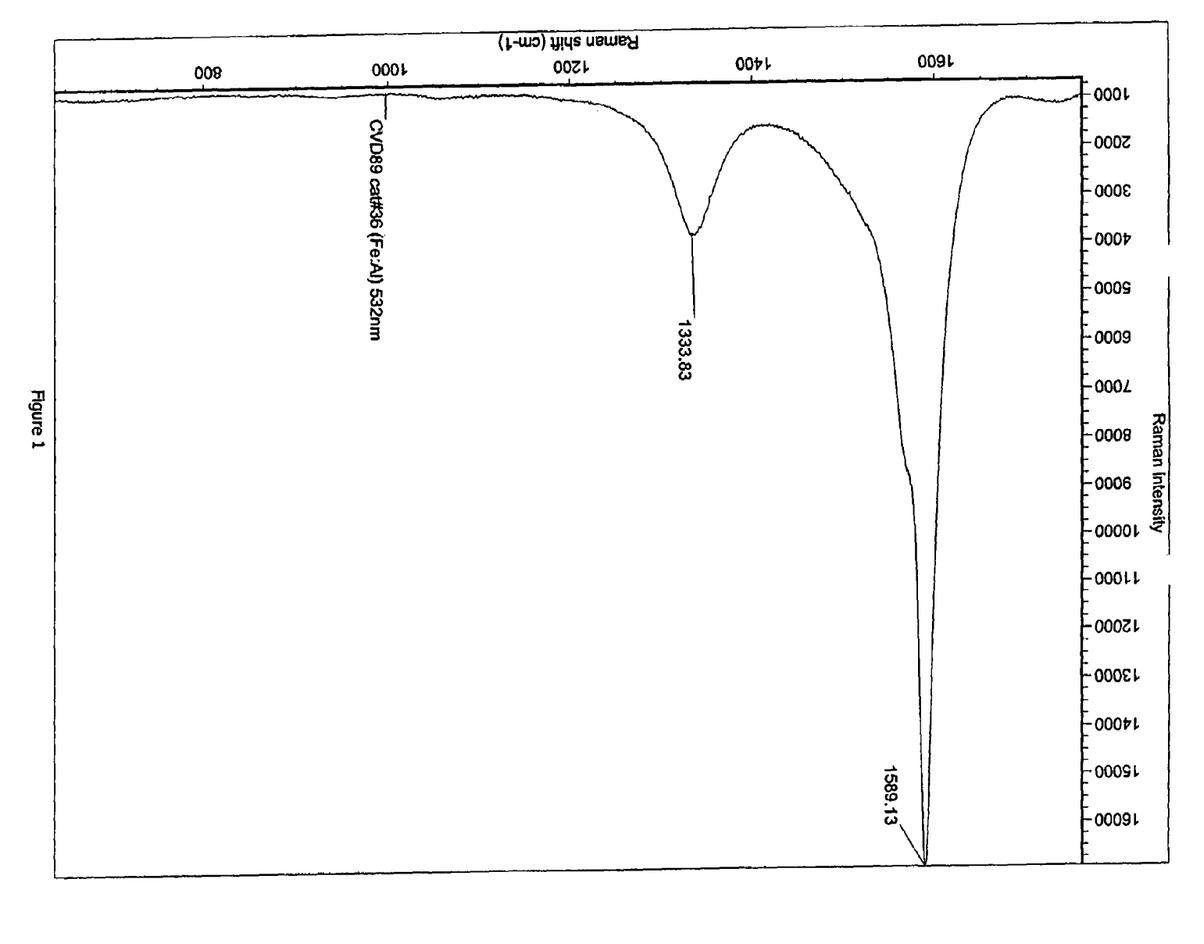
FIG. 1 depicts Raman spectra of carbon SWNTs ($\lambda$=532 nm excitation) grown using alumina supported iron nanoparticles with a ratio of 1:2.
Figure 2:
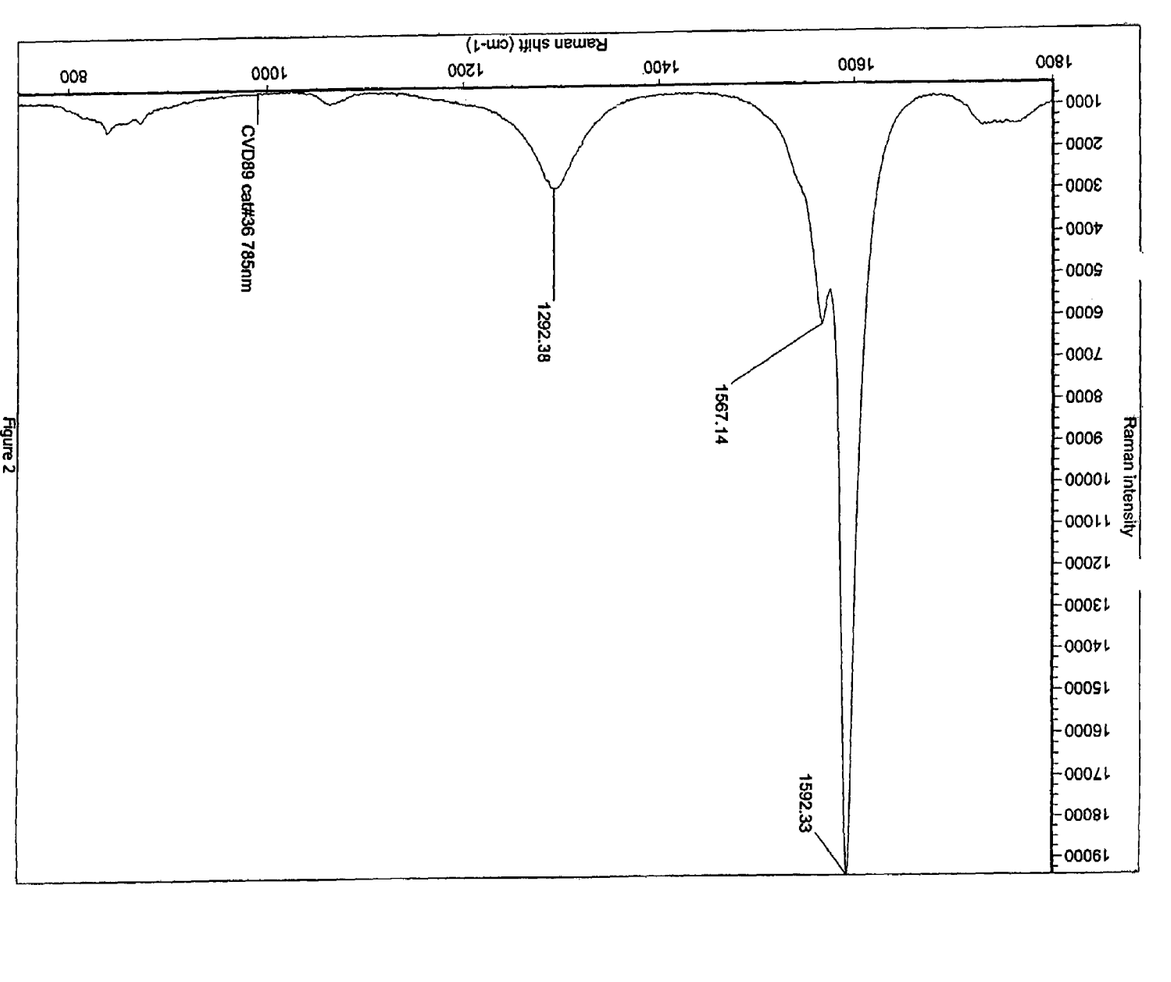
FIG. 2 depicts Raman spectra of carbon SWNTs ($\lambda$=785 nm excitation) grown using alumina supported iron nanoparticles with a ratio of 1:2.

Carbon nanotubes were synthesized by using the experimental setup described in Harutyunyan et al., NanoLetters 2, 525 (2002). CVD growth of bulk SWNTs used the catalysts prepared in Example 1 and methane as a carbon source (T=800° C., methane gas flow rate 60 sccm). The carbon SWNTs were successfully synthesized with a yield of about 120 wt % (wt % carbon relative to the iron/alumina catalyst). Analysis of transmission electron microscopy (TEM) images of SWNTs produced showed bundles were produced. Raman spectra of carbon SWNTs produced using produced by the method above for λ=532 nm and λ=785 nm laser excitation are shown in FIGS. 1 and 2 respectively. The carbon nanotubes yields are higher when made by using the inventive catalysts, and have similar quality to SWNTs produced using the literature catalyst.

While the invention has been particularly shown and described with reference to a preferred embodiment and various alternate embodiments, it will be understood by persons skilled in the relevant art that various changes in form and details can be made therein without departing from the spirit and scope of the invention. All printed patents and publications referred to in this application are hereby incorporated herein in their entirety by this reference.

We claim:

1. A method for producing supported metal nanoparticles, the method comprising:
   providing a solution comprising mixing a catalyst, a support, and a solvent wherein the catalyst and the support are in a ratio of about 1:1 to about 1:5 by weight; and
   heating the solution to form supported metal nanoparticles, wherein the support comprises a metal ion selected from the group consisting of Al, Si, and Mg and a counter ion.

2. The method of claim 1, wherein the catalyst comprises a metal ion and a counter ion.

3. The method of claim 2, wherein the metal ion is an ion of a metal selected from the group consisting of a Group V metal, a Group VI metal, a Group VII metal, a Group VIII metal, a lanthanide, a transition metal, and mixtures thereof.

4. The method of claim 3, wherein the metal is selected from the group consisting of Fe, V, Nb, Cr, W, Mo, Mn, Re, Co, Ni, Ru, Rh, Pd, Os, Ir, Pt, Ce, Eu, Er, Yb, Ag, Au, Zn, Cd, Sc, Y, La and mixtures thereof.

5. The method of claim 4, wherein the metal is Cr, Fe, Ni, Co, Y, Hf, Mo, or combinations thereof.

6. The method of claim 2, wherein the metal is selected from the group consisting of Co—Cr, Co—W, Co—Mo, Ni—Cr, Ni—W, Ni—Mo, Ru—Cr, Ru—W, Ru—Mo, Rh—Cr, Rh—W, Rh—Mo, Pd—Cr, Pd—W, Pd—Mo, Jr—Cr, Pt—Cr, Pt—W, and Pt—Mo.

7. The method of claim 6, wherein the metal is selected from the group consisting Fe—Mo, Co—Mo and Ni—Fe—Mo.

8. The method of claim 2, wherein the counter ion is selected from the group consisting of nitrate, nitrite, nitride, perchlorate, sulfate, sulfide, acetate, halide, hydroxide, methoxide, ethoxide, and acetylacetonate.

9. The method of claim 1, wherein the support is Al.

10. The method of claim 1, wherein the counter ion is selected from the group consisting of nitrate, nitrite, nitride, perchlorate, sulfate, sulfide, acetate, halide, hydroxide, methoxide, ethoxide, and acetylacetonate.

11. The method of claim 10, wherein support counter ion is the same as catalyst counter ion.

12. The method of claim 1, wherein the ratio is about 1:1 to about 1:3 by weight.

13. The method of claim 1, wherein the solvent is selected from the group consisting of water, methanol, ethanol, propanol, butanol, glycol ether, and combinations thereof.

14. The method of claim 13, wherein the solvent is water.

15. The method of claim 13, wherein the solvent is a glycol ether.

16. The method of claim 15, wherein the glycol ether is 2-(2-butoxyethoxy)ethanol.

17. The method of claim 1, wherein heating the solution comprises refluxing the solution.

18. A chemical vapor deposition method for the preparation of single-wall carbon nanotubes (SWNT), the method comprising:
producing supported metal nanoparticles by mixing a catalyst, a support, and a solvent;
heating the solution to form supported metal nanoparticles, wherein the support comprises a metal ion selected from the group consisting of Al, Si, and Mg and a counter ion, and wherein the catalyst and the support are in a ratio of about 1:1 to about 1:5 by weight; and
contacting a carbon precursor gas with supported metal nanoparticles wherein SWNTs are produced.

19. The method of claim 18, wherein the catalyst comprises a metal ion and a counter ion.

20. The method of claim 19, wherein the metal ion is an ion of a metal selected from the group consisting of a Group V metal, a Group VI metal, a Group VII metal, a Group VIII metal, a lanthanide, a transition metal, and mixtures thereof.

21. The method of claim 20, wherein the metal is selected from the group consisting of Fe, V, Nb, Cr, W, Mo, Mn, Re, Co, Ni, Ru, Rh, Pd, Os, Ir, Pt, Ce, Eu, Er, Yb, Ag, Au, Zn, Cd, Sc, Y, La and mixtures thereof.

22. The method of claim 21, wherein the metal is Cr, Fe, Ni, Co, Y, Hf, Mo, or combinations thereof.

23. The method of claim 19, wherein the metal is selected from the group consisting of Co—Cr, Co—W, Co—Mo, Ni—Cr, Ni—W, Ni—Mo, Ru—Cr, Ru—W, Ru—Mo, Rh—Cr, Rh—W, Rh—Mo, Pd—Cr, Pd—W, Pd—Mo, Jr—Cr, Pt—Cr, Pt—W, and Pt—Mo.

24. The method of claim 23, wherein the metal is selected from the group consisting Fe—Mo, Co—Mo and Ni—Fe—Mo.

25. The method of claim 19, wherein the counter ion is selected from the group consisting of nitrate, nitrite, nitride, perchlorate, sulfate, sulfide, acetate, halide, hydroxide, methoxide, ethoxide, and acetylacetonate.

26. The method of claim 18, wherein the support is Al.

27. The method of claim 18, wherein the counter ion is selected from the group consisting of nitrate, nitrite, nitride, perchlorate, sulfate, sulfide, acetate, halide, hydroxide, methoxide, ethoxide, and acetylacetonate.

28. The method of claim 27, wherein support counter ion is the same as catalyst counter ion.

29. The method of claim 18, wherein the ratio is about 1:1 to about 1:3 by weight.

30. The method of claim 18, wherein the solvent is selected from the group consisting of water, methanol, ethanol, propanol, butanol, glycol ether, and combinations thereof.

31. The method of claim 30, wherein the solvent is water.

32. The method of claim 30, wherein the solvent is a glycol ether.

33. The method of claim 18, wherein heating the solution comprises refluxing the solution.

34. The method of claim 18, wherein the carbon precursor gas is methane.

35. The method of claim 34, wherein the carbon precursor gas further comprises an inert gas and hydrogen.

36. The method of claim 35, wherein the inert gas is argon, helium, nitrogen, hydrogen, or combinations thereof.

* * * * *

UNITED STATES PATENT AND TRADEMARK OFFICE
CERTIFICATE OF CORRECTION

PATENT NO.       : 7,485,600 B2
APPLICATION NO.  : 10/992277
DATED            : February 3, 2009
INVENTOR(S)      : Avetik Harutyunyan et al.

It is certified that error appears in the above-identified patent and that said Letters Patent is hereby corrected as shown below:

Column 11, line 17, delete "Jr—Cr" and insert --Ir—Cr--.

Column 12, line 21, delete "Jr—Cr" and insert --Ir—Cr--.

Signed and Sealed this

Fourteenth Day of April, 2009

JOHN DOLL
*Acting Director of the United States Patent and Trademark Office*